United States Patent [19]

Kitamoto

[11] Patent Number: 4,870,831

[45] Date of Patent: Oct. 3, 1989

[54] MULTI-TYPE AIR CONDITIONER SYSTEM WITH OIL LEVEL CONTROL FOR PARALLEL OPERATED COMPRESSOR THEREIN

[75] Inventor: Manabu Kitamoto, Fuji, Japan

[73] Assignee: Kabushiki Kaisha Toshiba, Kawasaki, Japan

[21] Appl. No.: 305,906

[22] Filed: Feb. 2, 1989

[30] Foreign Application Priority Data

Feb. 9, 1988 [JP] Japan .................. 63-28112
Feb. 9, 1988 [JP] Japan .................. 63-28115
Feb. 10, 1988 [JP] Japan .................. 63-29277

[51] Int. Cl.⁴ .............................. F25B 39/04
[52] U.S. Cl. .......................... 62/84; 62/175; 62/193; 417/3
[58] Field of Search ............. 62/84, 193, 228.4, 175, 62/230; 417/3

[56] References Cited

U.S. PATENT DOCUMENTS 4,589,263  5/1986  Dicarlo et al. ............ 62/193
4,633,672  1/1987  Persem et al. ............ 62/175 X
4,750,337  6/1988  Glamm .................... 62/84 X

FOREIGN PATENT DOCUMENTS 61-205754  9/1986  Japan .
62-87770   4/1987  Japan .
62-102046  5/1987  Japan .

Primary Examiner—William E. Wayner
Attorney, Agent, or Firm—Cushman, Darby & Cushman

[57] ABSTRACT

An outdoor unit has at least two variable-capability compressors and has an outdoor heat exchanger coupled to the compressors having lubricating oil supplying sections coupled together by an oil-balancing member. A plurality of indoor units are each coupled to the outdoor unit for forming a refrigerating cycle and each have at least an indoor heat exchanger and an output section for outputting demand capability data according to an air conditioning load of the indoor heat exchanger. In accordance with the demand capability data, a controller generates a parallel operation command for parallel operation involving both of the compressors of the outdoor unit with capability according to a sum of the demand capability data from the indoor units. The parallel operation command is executed by repeating a normal operation command for performing a normal operation over a given time and first and second oil-balancing operation commands for every given cycle, the first and second oil-balancing operation commands for effecting first and second oil-balancing operations having a mutually complimentary relation in preceding and succeeding stages of the normal operation.

32 Claims, 5 Drawing Sheets

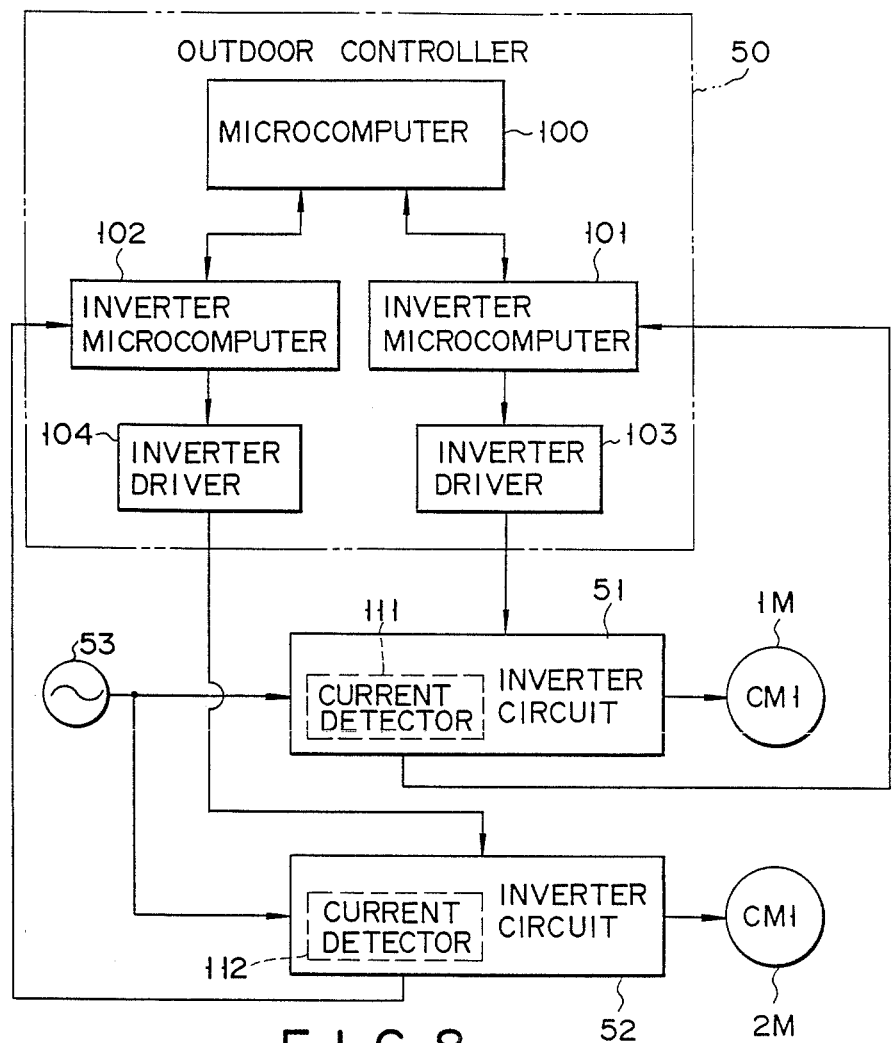
F I G. 8
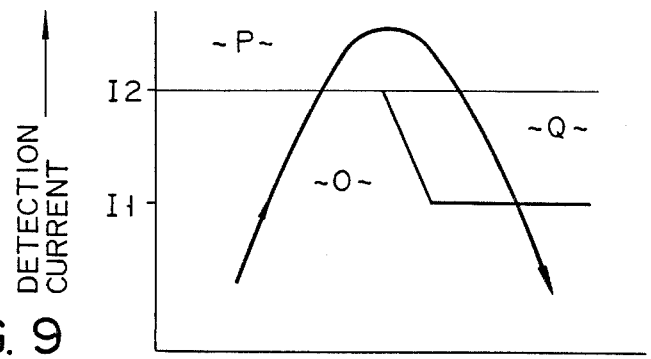
F I G. 9

MULTI-TYPE AIR CONDITIONER SYSTEM WITH OIL LEVEL CONTROL FOR PARALLEL OPERATED COMPRESSOR THEREIN

RELATED APPLICATION

The subject matter of the present invention is generally related to the subject matter of the following U.S. applications:

| Application No. | Filed | Name of Applicant |
|---|---|---|
| 07/225,483 | July 28, 1988 | Kitamoto |
| Clt. Ref: EKI-63P1090-1 | Not yet filed | Unknown |

BACKGROUND OF THE INVENTION

1. Field of the Invention

The present invention relates to a multi-type air conditioner system with an oil level control for parallel operating compressors and, more particularly, to an air conditioner system having a heat-pump type refrigerating cycle, which includes an outdoor unit having at least two variable-capability compressors and a plurality of indoor units.

2. Description of the Related Art

In general, the above multi-type air conditioner system performs a single-compressor operation involving one of the compressors of the outdoor unit or a parallel operation involving two compressors in accordance with a demand capability of each indoor unit.

The outdoor unit has two variable-capability compressors and two inverter circuits for supplying drive power to these compressors. This outdoor unit is coupled with a branching unit to which a plurality of indoor units are coupled.

With the above design, the individual indoor units send to the branching unit their respective frequency setting signals representing their demand capabilities according to their air conditioning loads. The branching unit acquires the demand capabilities of the individual indoor units from the received frequency setting signals and sends a sum frequency setting signal corresponding to the sum of the demand capabilities, to the outdoor unit. In accordance with the received sum frequency setting signal, the outdoor unit controls the output frequency of each inverter circuit to fulfill the capability requested by each indoor unit.

The present inventors have already disclosed an invention which contributes to an improvement of this type of air conditioner system, in U.S. patent application Ser. No. 225,483, entitled "Multi-Type Air Conditioner System With Starting Control For Parallel Operated Compressor Therein" and filed on July 28, 1988, Great Britain Patent Application No. 8818016.1 and filed on July 25, 1988, Australian Patent Application No. 19792/88. The disclosed invention is concerned with a technique for smooth execution of the above mentioned parallel operation and improvement of oil-balancing effect.

The technique for improving the oil-balancing effect is to provide an oil return passage in the individual compressors having their base sections coupled to each other by an oil-balancing pipe, thereby preventing the undesired locking of the compressors which may be caused by dry-out of the oil.

This technique disclosed in the earlier application is particularly effective in a case where two compressors have the exact (maximum) capability. In practice, however, no two compressors are exactly the same so that their capabilities, though specified to be the same, should differ from each other in strict sense. It is often the case that two compressors having a significant difference in their (maximum) capabilities are combined in the aforementioned air conditioner system, a combination of three-horse power (HP) type and five-horse power (HP) type, for example.

It is therefore necessary to further improve the oil-balancing effect which could be provided by the technique used in the earlier application.

As will be described later, using a large-diameter oil-balancing pipe can provide an oil-balancing effect that copes with the difference in capabilities of two compressors. In this case, however, there would arise a problem of generating undesired vibration or noise that is transmitted to each compressor through the large-diameter oil-balancing pipe. This problem is likely to deteriorate the mechanical strength of this pipe and thus damage or break it at the worst, which is crucial to the air conditioner system in terms of reliability.

In this respect, therefore, it is necessary to consider some means to prevent adverse influence on current release from being caused by the aforementioned improvement of the oil-balancing effect.

SUMMARY OF THE INVENTION

Accordingly, it is an object of this invention to provide a new and improved multi-type air conditioner system with an oil level control for parallel operating compressors therein, which system can provide an oil-balancing effect between compressors without using a large-diameter oil-balancing pipe to thereby prevent transmission of compressor vibration or compressor noise to indoor units, can ensure a sufficient strength of an oil-balancing pipe and has a high reliability.

It is another object of this invention to provide an air conditioner system which, in addition to the above features, can further improve the oil-balancing effect.

It is a further object of this invention to provide an air conditioner system which can surely execute oil-balancing operation without any influence of a current release operation to thereby always ensure a stable operation.

According to one aspect of this invention, there is provided an air conditioner comprising:

an outdoor unit having at least two variable-capability compressors and an outdoor heat exchanger coupled to the compressors having lubricating oil supplying sections coupled together by an oil-balancing member;

a plurality of indoor units each coupled to the outdoor unit for forming a refrigerating cycle and each having at least an indoor heat exchanger and means for outputting demand capability data according to an air conditioning load of the indoor heat exchanger; and control means for generating, in accordance with the demand capability data, a parallel operation command for parallel operation involving both of the compressors of the outdoor unit with capability according to a sum of the demand capability data from the indoor units, the parallel operation command being a repetition of a normal operation command for performing a normal operation over a given time and first and second oil-balancing operation commands for every given cycle, the first and second oil-balancing operation commands for effecting first and second oil-balancing operations having a mutually complimentary relation in preceding and succeeding stages of the normal operation.

BRIEF DESCRIPTION OF THE DRAWINGS

These and other objects and features of the present invention should be understood from the following detailed description of preferred embodiments with reference to the accompanying drawings in which:

FIG. 1 being a schematic diagram illustrating the general refrigerating cycle within an air conditioner, FIG. 2 being a schematic diagram illustrating the relation between each compressor and an oil-balancing pipe, FIG. 3 being a schematic diagram illustrating the structure of a refrigerating cycle, FIG. 4 being a characteristic diagram illustrating the state of an operational frequency changing at the time of oil-balancing operation, FIG. 5 being a schematic diagram illustrating the changing state of an oil level in a case where the operational frequency of the first compressor shown in FIG. 5 is set lower than that of the second compressor, and FIG. 6 being a schematic diagram illustrating the changing state of an oil level in a case where the operational frequency of the first compressor is set higher than that of the second compressor.

FIG. 8 is a diagram illustrating a specific example of an indoor controller and its peripheral circuits according to the third embodiment; and FIG. 9 is a diagram illustrating the relation between a detected current and a set value according to the third embodiment.

DETAILED DESCRIPTION OF THE PREFERRED EMBODIMENTS

Figure 1:
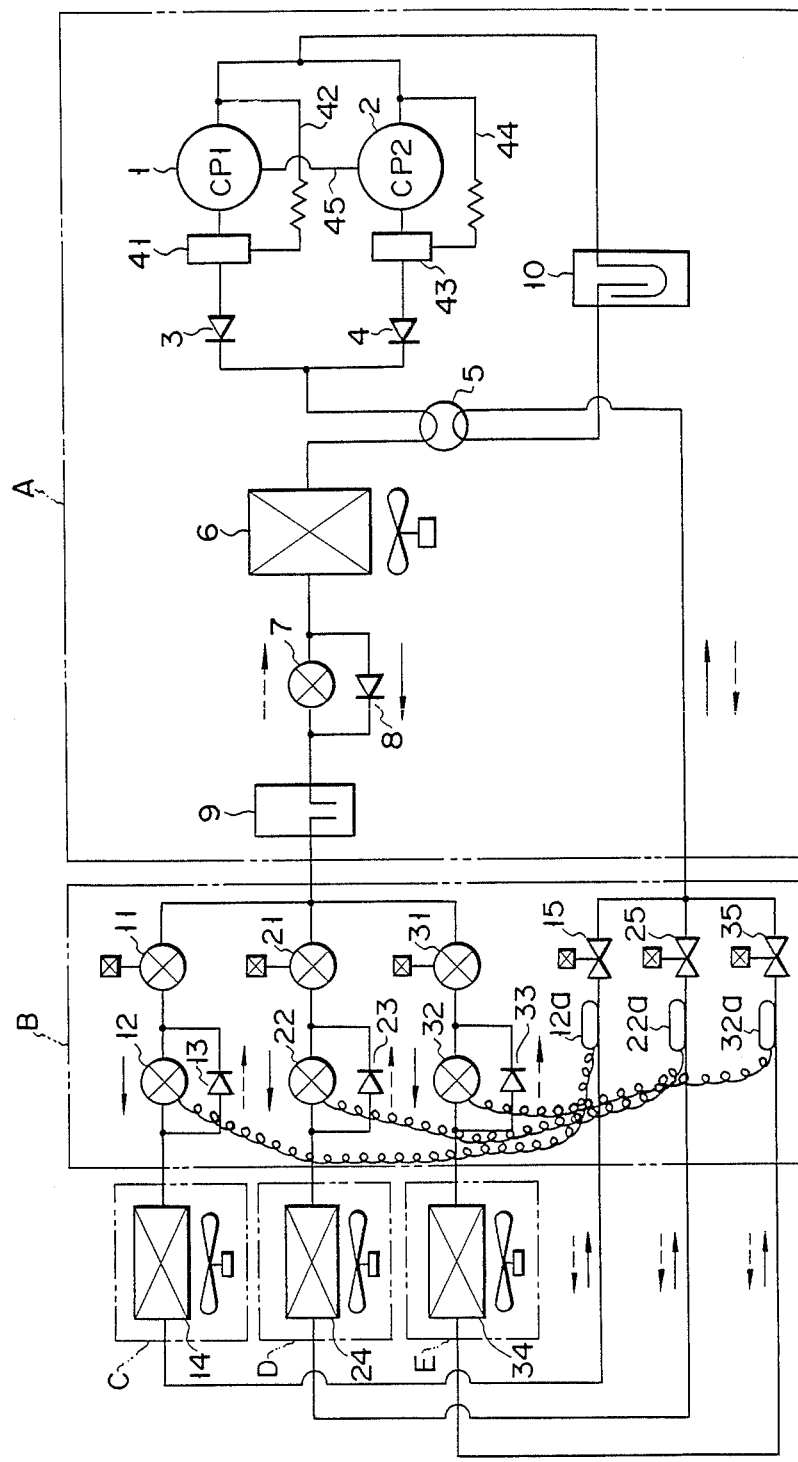
FIGS. 1 through 6 illustrate the first embodiment of this invention.

To begin with the first embodiment of this invention will be described below with reference to FIGS. 1 through 6. The same reference numerals as given in FIG. 1 are used in FIGS. 2 to 6 to specify identical or corresponding components for omission of their description.

FIG. 1 illustrates a heat-pump type refrigerating cycle to which the multi-type air conditioner system embodying this invention is applied.

In FIG. 1, reference numeral A denotes an outdoor unit, B denotes a branching unit, and C, D and E denote indoor units. Outdoor unit A is equipped with two variable-capability compressors 1 and 2 which are coupled in parallel via check valves 3 and 4, respectively. A heat-pump type refrigerating cycle is formed through compressors 1 and 2, a four-way valve 5, a parallel arrangement of an outdoor heat exchanger 6, a heating expansion valve 7 and a check valve 8 for forming a cooling cycle, a liquid tank 9, electrically-powered flow rate control valves 11, 21 and 31, a parallel arrangement of cooling expansion valves 12, 22 and 32 and check valves 13, 23 and 33 for forming a heating cycle, indoor heat exchangers 14, 24 and 34, gas-side opening valves (electromagnetic opening valves) 15, 25 and 35, and an accumulator 10.

Cooling expansion valves 12, 22 and 32 respectively have heat-sensing tubes 12a, 22a and 32a attached to gas-side cooling medium pipes of indoor heat exchangers 14, 24 and 34.

In other words, indoor heat exchangers 14, 24 and 34 are arranged in parallel to pass a cooling medium in the direction of the illustrated solid arrows at the time of a cooling operation, to thereby form a cooling cycle, and this arrangement passes a cooling medium in the direction of the illustrated, broken arrows at the time of a heating operation through a switching operation executed by four-way valve 5, to thereby form a heating cycle.

In such an air conditioner system, the quantity of compressors 1 and 2 in operation and their capabilities are controlled to provide the demand capability of each indoor unit and the opening of flow rate control valves 11, 21 and 31 are controlled to adjust the rate of the cooling medium flowing in each indoor heat exchanger.

Expansion valves 12, 22 and 32 serve to maintain a constant heat application to the cooling medium irrespective of a change in the flow rate of the cooling medium, thus ensuring a stable and efficient operation.

When the demand capability of each indoor unit increases at the time of, for example, a cooling operation, therefore, the capability of compressor 1 may be increased or compressor 2 may even be driven in addition to compressor 1. When the demand capability of each indoor unit decreases in this state, the capability of compressor 2 may be reduced or, compressor 2 may even be stopped, leaving only compressor 1 being driven.

With the above arrangement alone, however, the amount of a lubricating oil outgoing from compressors 1 and 2 and the amount of the oil returning thereto are not exactly the same, so that the amount of the lubricating oil in one compressor increases with time while that in the other compressor decreases. This causes imbalance of the oil quantity between these compressors and thus makes it difficult to ensure a stable operation.

Further, when the level of the lubricating oil falls below a oil level limit (operatable level), the supply of the lubricating oil to a lubricating section is stopped, which may damage compressors 1 and 2.

To overcome the possible unbalanced amounts of oil in compressors 1 and 2, it is proposed in the aforementioned earlier application to connect these compressors by an oil-balancing pipe so that the lubricating oil can flow from the one containing a larger amount of oil to the other with less oil.

Since the capabilities of the individual compressors 1 and 2 are not exactly the same, the one with a larger capability would have a larger pressure loss in an oil inlet pipe and have a smaller pressure within the compressor casing. This tendency is prominent if compressors 1 and 2 have different capacities.

As a result, the cooling medium gas flows through the oil-balancing pipe to the compressor having a lower internal casing pressure from the other having a higher internal casing pressure, and the lubricating oil flows in the same direction accordingly.

When the amount of the lubricating oil returning to the latter compressor with a higher internal casing pressure is greater than the amount of the oil outgoing therefrom, the lubricating oil above the oil-balancing pipe moves through the pipe to the compressor with a lower internal casing pressure. Accordingly, the oil levels in the individual compressors become equal to each other at the position of the oil-balancing pipe. On the other hand, when the amount of the returning oil is smaller than the amount of the outgoing oil, the oil level in the compressor with a higher internal casing pressure decreases with time below the oil level limit. In this case, the lubricating oil in the compressor with a lower internal casing pressure is interrupted from going to the compressor with a lower internal casing pressure due to this difference in internal casing pressure.

In this respect, therefore, an oil-balancing pipe with a wide oil passage may be used as mentioned earlier to balance the oil levels in compressors 1 and 2 as well as to set a balanced internal casing pressure in both compressors.

However, the use of a large-diameter oil-balancing pipe makes it easier to transmit the vibration generated in one compressor to the other so that resonance or the like may occur depending on a combination of the operational frequencies of both compressors 1 and 2. This may result in compressor vibration or compressor noise and may damage the oil-balancing pipe.

In other words, if compressors 1 and 2 are connected to each other simply by an oil-balancing pipe, the lubricating oil in the casing of the compressor having a higher internal casing pressure flows through the pipe to the other one having a lower internal casing pressure due to the difference in this pressure which is caused by a difference in capability of the compressors, thus imbalancing the oil levels in the casings of the compressors. If an oil-balancing pipe with a wide oil passage is used to balance the oil levels in compressors 1 and 2 as well as to set a balanced internal casing pressure in both compressors, it becomes easier to transmit the vibration generated in one compressor to the other so that resonance or the like may occur depending on a combination of the operational frequencies of both compressors 1 and 2. This may result in compressor vibration or compressor noise and may damage the oil-balancing pipe as well.

With the above in mind, the air conditioner system according to the first embodiment of this invention is designed to perform such a control as to repeat the following operations for a given cycle T (for example, T=15 min.) during a parallel operation of both compressors. The operations include a normal operation for driving both compressors at substantially the same operational frequency over a given time $t_0$ (for example, $t_0$=12 min.), a first oil-balancing operation, which follows the normal operation and drives one of the compressors at alternate higher and lower operational frequencies than the operational frequency of the other compressor for every given times $t_1$ and $t_2$ (for example, $t_1=t_2=90$ sec.) while maintaining the operational frequency of the latter compressor at a predetermined level, a second oil-balancing operation, which drives the compressors with the relation of their operational frequencies involved in the first oil-balancing operation being reversed after the normal operation is carried out following the first oil-balancing operation.

In short, the air conditioner system with the above design repeats the normal operation, first oil-balancing operation and second oil-balancing operation for a given cycle during parallel operation of the compressors. Under the first and second oil-balancing operations, the operational frequencies of these compressors are changed, one higher than the other, so that the lubricating oil in the casings of both compressors can efficiently flow through the oil-balancing pipe. Therefore, this air conditioner system can provide oil-balancing effect between the individual compressors without employing a large-diameter oil-balancing pipe and can prevent generation of compressor vibration and compressor noise.

The above control will now be described more specifically. As shown in FIG. 1, an oil separator 41 is provided to a cooling medium outlet pipe of compressor 1, and an oil bypass pipe 42 is provided to extend from the separator 41 to a cooling medium inlet pipe of compressor 1.

Further, an oil separator 43 is provided to a cooling medium outlet pipe of compressor 2, and an oil bypass pipe 44 is provided to extend from the separator 43 to a cooling medium inlet pipe of compressor 2.

Figure 2:
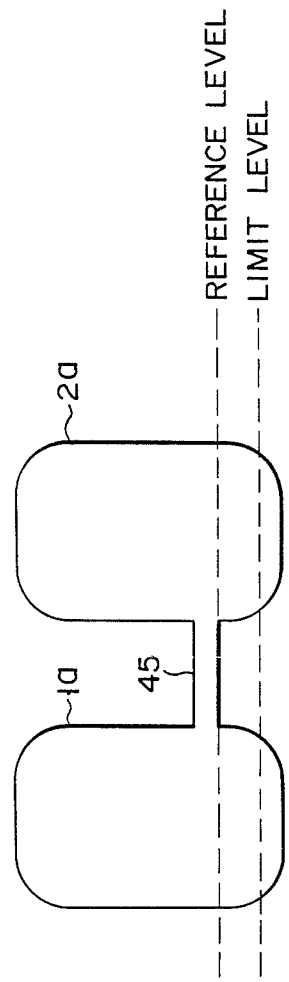

Casings 1a and 2a of compressors 1 and 2 are connected to communicate with each other by means of an oil-balancing pipe 45, as shown in FIG. 2. In this case, compressors 1 and 2 are disposed in the same plane. Compressors 1 and 2 are set in advance with the proper reference oil level and the allowable minimum oil level for the lubricating oil retained within casings 1a and 2a; pipe 45 is mounted at substantially the same height as the reference oil level. Diameter of pipe 45 is 12.7 mm, for example, in both combination of 3 HP and 5 HP or 5 HP and 5 HP types compressors.

Figure 3:
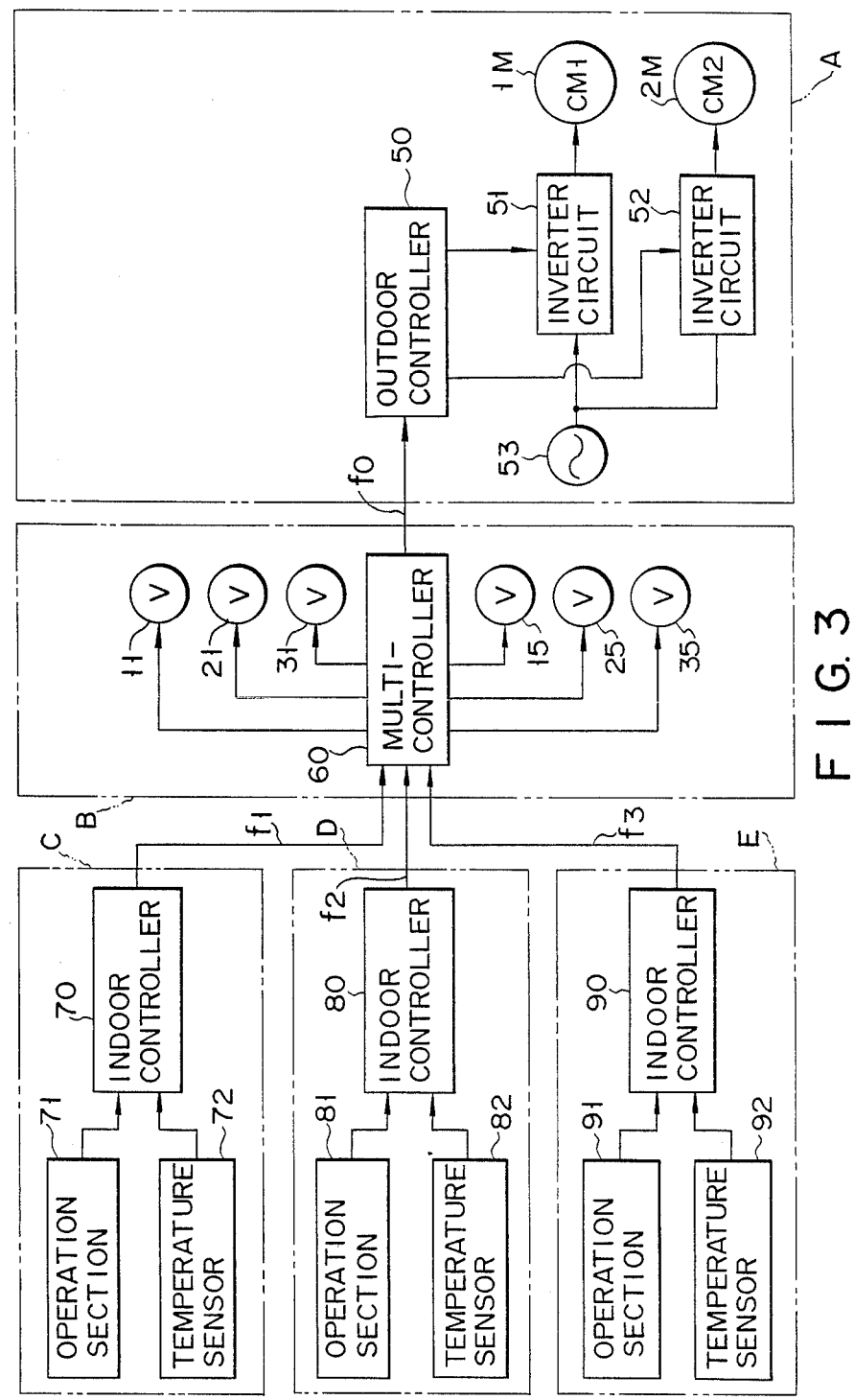

FIG. 3 illustrates a controller for a refrigerating cycle. In this diagram, reference numeral 50 denotes an outdoor controller mounted in outdoor unit A. This outdoor controller 50 comprises a microcomputer and its peripheral circuits and has its outputs coupled to inverter circuits 51 and 52. Inverter circuits 51 and 52 rectify the voltage from an AC power source 53, convert the resultant voltages into AC voltages with given frequencies in accordance with a command from outdoor controller 50, and supply the converted voltages as drive power to compressor motors 1M and 2M, respectively.

Reference numeral 60 denotes a multi-controller mounted in branching unit B. This multi-controller 60 comprises a microcomputer and its peripheral circuits and has its outputs coupled to flow rate control valves 11, 21 and 31 and opening valves 15, 25 and 35.

Reference numerals 70, 80 and 90 denote indoor controllers mounted respectively in indoor units C, D and E. These indoor controllers 70, 80 and 90 each comprise a microcomputer and its peripheral circuits and are coupled to operation sections 71, 81 and 91 and indoor temperature sensors 72, 82 and 92, respectively.

The individual indoor controllers 70, 80 and 90 send frequency setting signals $f_1$, $f_2$ and $f_3$ as demand capabilities to multi-controller 60. Multi-controller 60 in turn acquires the sum of the demand capabilities of the individual indoor units C, D and E from the received frequency setting signals and sends a frequency setting signal $f_0$ corresponding to the sum to outdoor controller 50 as controlled capability.

Note that the multi-controller is described in detail in U.S. Pat. No. 4,720,982 assigned to the present applicant. This description is incorporated herein.

The operation of thus constructed air conditioner system will be described below.

Assume now that all the indoor units are performing a cooling operation.

At this time, indoor controller 70 of indoor unit C calculates the difference between the temperature detected by indoor temperature sensor 72 and the temperature set through operation section 71 and sends the frequency setting signal $f_1$ corresponding to the temperature difference to multi-controller 60 as the requested cooling capability. Similarly, indoor controllers 80 and 90 of indoor units D and E send the frequency setting signals $f_2$ and $f_3$ as the requested cooling capabilities to multi-controller 60.

Based on the received frequency setting signals, multi-controller 60 attains the sum of the requested cooling capabilities of the individual indoor units C, D and E, and sends the frequency setting signal $f_0$ corresponding to the acquired sum to outdoor controller 50. Based on the received frequency setting signal $f_0$, outdoor controller 50 acquires the sum of the requested cooling capabilities of indoor units C, D and E, and controls the quantity of compressors 1 and 2 in operation and the operational frequency F (output frequencies of inverter circuits 51 and 52). In this case, as the sum of the requested cooling capabilities increases, outdoor controller 50 changes a single-compressor operation involving compressor 1 to a parallel operation involving both compressors 1 and 2.

During operation of compressor 1, most of the lubricating oil included in the pumped out cooling medium is collected by oil separator 41 and is returned to compressor 1 through oil bypass pipe 42. Similarly, during operation of compressor 2, most of the lubricating oil included in the pumped out cooling medium is collected by oil separator 43 and is returned to compressor 2 through oil bypass pipe 44. That cooling medium which has not been collected circulates through the refrigerating cycle and returns to compressors 1 and 2.

Multi-controller 60 controls the openings of flow rate control valves 11, 21 and 31 in accordance with the frequency setting signals from indoor units C, D and E, so that the proper amounts of the cooling medium corresponding to the requested cooling capabilities of these indoor units C, D and E will flow through indoor heat exchangers 14, 24 and 34, respectively. In addition, expansion valves 12, 22 and 32 control the heat application to the cooling medium in the respective indoor heat exchangers 14, 24 and 34 at a predetermined level.

Outdoor controller 50 performs such a control as to repeat the following three operations for a given cycle T during a parallel operation of both compressors 1 and 2:

(1) The normal operation for driving both compressors 1 and 2 at substantially the same operational frequency over a given time $T-(t_1+t_2)$.

(2) The first oil-balancing operation which follows the normal operation and drives one of compressors, for example, 1, at alternate higher and lower operational frequencies Fa than the operational frequency Fb of the other compressor 2 for every given times $t_1$ and $t_2$ while maintaining the operational frequency Fb of the latter compressor 2 at a predetermined frequency $Fb_0$.

(3) The second oil-balancing operation which drives compressors 1 and 2 with the relation of their operational frequencies involved in the first oil-balancing operation being reversed after the normal operation is carried out following the first oil-balancing operation.

Figure 4:
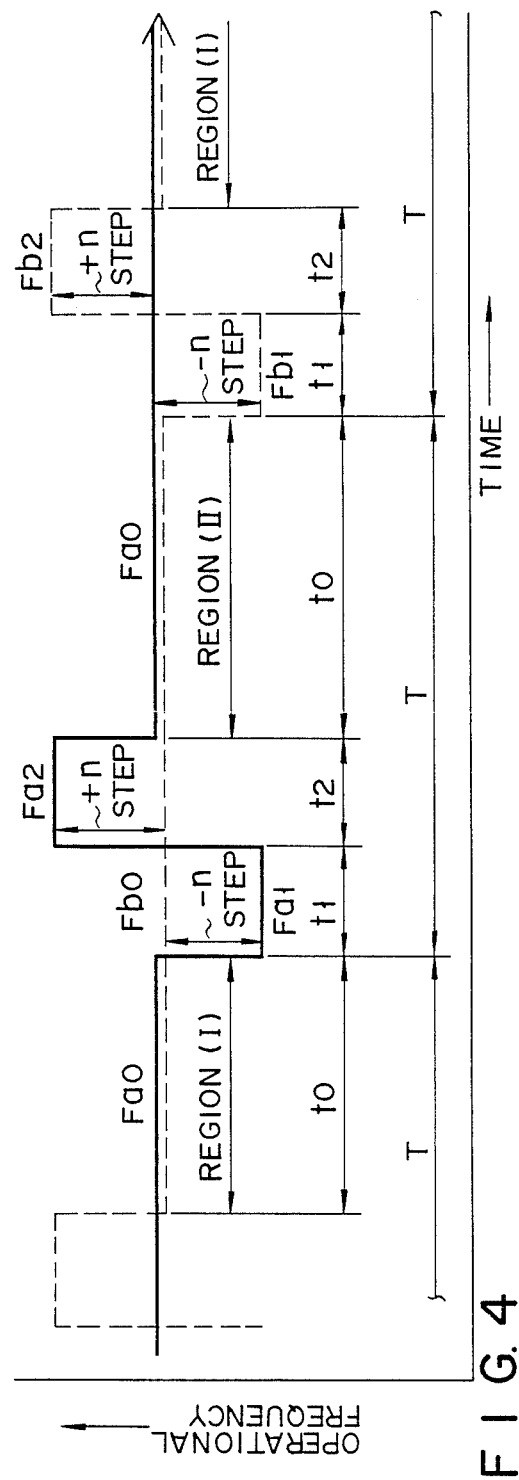
Figure 5:
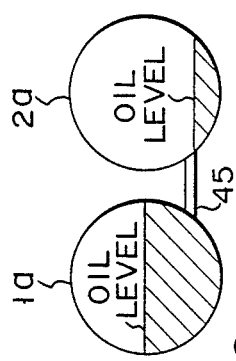
Figure 6:
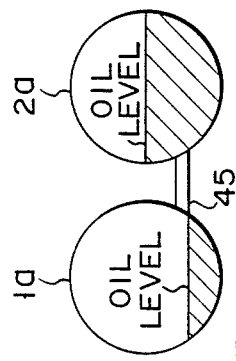

Referring now to FIGS. 4 through 6, a description will be given of the oil-balancing operation of compressors 1 and 2. FIG. 4 illustrates a change in operational frequency Fa of one compressor 1 (which is illustrated by the solid line in FIG. 4) and a change in operational frequency Fb of the other compressor 2 (which is illustrated by the broken line) in the oil-balancing operation.

Suppose that compressors 1 and 2 are driven in the normal operation mode with their operational frequencies Fa and Fb being set at substantially the same value (i.e., $Fa_0 \approx Fb_0 = 56.4$ Hz, for example), and the first oil-balancing operation is executed after a given time $T-(t_1+t_2)$ is elapsed in this normal operation.

At the time of the first oil-balancing operation, first, the operational frequency Fa of one compressor 1 is reduced by n step frequencies over time $t_1$. In this case, the operational frequency Fb of the other compressor 2 is maintained at $Fb_0$. Accordingly, the operational frequency $Fa_1$ of compressor 1 becomes lower than the operational frequency $Fb_0$ of compressor 2. As a result, the internal casing pressure Pa of compressor 1 gets higher than the internal casing pressure Pb of compressor 2, so that the lubricating oil in the casing of high-pressure-side compressor 1 gradually flows together with the cooling medium in the casing of low-pressure-side compressor 2 through pipe 45. This gradually lowers the oil level within the casing of compressor 1 and gradually increases the oil level within the casing of compressor 2, as shown in FIG. 5. The lower limit of the oil level in the casing of compressor 1 is the bottom line of pipe 45 in this case.

When time $t_1$ elapses with the operational frequency Fa of compressor 1 being reduced to $Fa_1$ (=31.1 Hz for example), this frequency Fa is increased by n step frequencies from $Fa_0$ over time $t_2$. In this case, the operational frequency Fb of the other compressor 2 is maintained at $Fb_0$. Accordingly, the operational frequency $Fa_2$ (=90 Hz, for example) of compressor 1 becomes higher than the operational frequency $Fb_0$ of compressor 2. As a result, the internal casing pressure Pa of compressor 1 gets lower than the internal casing pressure Pb of compressor 2, so that the lubricating oil in the casing of high-pressure-side compressor 2 gradually flows together with the cooling medium in the casing of low-pressure-side compressor 1 through pipe 45. This gradually lowers the oil level within the casing of compressor 2 and gradually increases the oil level within the casing of compressor 1, as shown in FIG. 6.

When time $t_2$ elapses with the operational frequency Fa of compressor 1 being increased to $Fa_2$, the first oil-balancing operation is completed at this moment, and the operation is returned to the normal operation with this frequency Fa being set back to $Fa_0$. In the normal operation region (II) after completing the first oil-balancing operation, therefore, the oil level in the casing of compressor 1 is kept higher than that in the casing of compressor 2, as shown in FIG. 6. The second oil-balancing operation is performed after a given time $T-(t_1+t_2)$ elapses in this normal operation mode.

At the time of the second oil-balancing operation, first, the operational frequency Fb of compressor 2 is reduced by n step frequencies (n=6, for example) over time $t_1$. In this case, the operational frequency Fa of compressor 1 is maintained at $Fa_0$. Accordingly, the operational frequency $Fb_1$ (=31.1 Hz, for example) of compressor 2 becomes lower than the operational frequency $Fa_0$ of compressor 1. As a result, the internal casing pressure Pb of compressor 2 gets higher than the internal casing pressure Pa of compressor 1, so that the lubricating oil in the casing of high-pressure-side compressor 2 gradually flows together with the cooling medium in the casing of low-pressure-side compressor 1 through pipe 45. This gradually lowers the oil level within the casing of compressor 2 and gradually increases the oil level within the casing of compressor 1, as shown in FIG. 6.

When time $t_1$ elapses with the operational frequency Fb of compressor 2 being reduced to $Fb_1$, this frequency Fb is increased by n step frequencies (n=6, for example) from $Fb_0$ over time $t_2$. In this case, the operational frequency Fa of compressor 1 is maintained at $Fa_0$. Accordingly, the operational frequency $Fb_2$ (=90 Hz, for example) of compressor 2 becomes higher than the operational frequency $Fa_0$ of compressor 1. As a result, the internal casing pressure Pb of compressor 2 gets lower than the internal casing pressure Pa of compressor 1, so that the lubricating oil in the casing of high-pressure-side compressor 1 gradually flows together with the cooling medium in the casing of low-pressure-side compressor 2 through pipe 45. This gradually lowers the oil level within the casing of compressor 1 and gradually increases the oil level within the casing of compressor 2, as shown in FIG. 5.

When time $t_2$ elapses with the operational frequency Fb of compressor 2 being increased to $Fb_2$, the operation is returned to the normal operation at this moment, with this frequency Fb being set back to $Fb_0$. In the normal operation region (I) after completing the second oil-balancing operation, therefore, the oil level in the casing of compressor 2 is kept higher than that in the casing of compressor 1, as shown in FIG. 5. Thereafter, the normal operation and the first oil-balancing operation or the second oil-balancing operation are alternately repeated for a given time period.

The air conditioner system with the above structure therefore performs such a control as to repeat the following three operations for a given cycle T during a parallel operation of both compressors 1 and 2:

(1) The normal operation for driving both compressors 1 and 2 at substantially the same operational frequency over a given time $t_0$.

(2) The first oil-balancing operation which follows the normal operation and drives one of compressors, for example, 1, at alternate higher and lower operational frequencies Fa than the operational frequency Fb of the other compressor 2 for every given times $t_1$ and $t_2$ while maintaining the operational frequency Fb of the latter compressor 2 at a predetermined frequency $Fb_0$.

(3) The second oil-balancing operation which drives compressors 1 and 2 with the relation of their operational frequencies involved in the first oil-balancing operation being reversed after the normal operation is carried out following the first oil-balancing operation.

Accordingly, it is possible to alternately switch the oil level statuses in compressors 1 and 2 in the normal operation range (II) after completion of the first oil-balancing operation and those in the normal operation range (I) after completion of the second oil-balancing operation from one to the other. Therefore, in a long-run operation, it is possible to prevent the oil level in one compressor from being imbalanced with respect to the other, thereby ensuring balanced oil levels in these compressors 1 and 2.

It is therefore possible to always ensure a stable operation and prevent the dry out of oil in compressors 1 and 2 or the locking of the compressors, which would result in preventing compressors 1 and 2 from being damaged due to such undesired phenomenon.

Further, oil-balancing pipe 45 need not have a large diameter and thus can keep a sufficient mechanical strength, resulting in avoidance of compressor vibration or compressor noise and making the system cost-effective.

In addition, the oil-balancing effect can be realized without particularly providing expensive float type regulators and level sensors in compressors 1 and 2, so that the overall system arrangement can be simplified, thus resulting in reduction of manufacturing cost.

Furthermore, during the oil-balancing operation of compressors 1 and 2, the operation for reducing the operational frequency to a level lower by n step frequencies than $Fa_0$ (or $Fb_0$) in the normal operation and the operation of increasing the operational frequency to be higher by n step frequencies than $Fa_0$ (or $Fb_0$) are alternately executed. During this oil-balancing operation, an abnormality in the output current of inverter circuit 51 (or 52) is discriminated at the time the operational frequency is increased by n step frequencies than $Fa_0$ (or $Fb_0$) in the normal operation for current release. Even if a current release for reducing the output frequency of inverter circuit 51 (or 52) to a given value is executed to thereby disable the oil-balancing operation at an increasing frequency, it is possible to surely execute the oil-balancing operation at the time the operational frequency is reduced by n step frequencies than $Fa_0$ (or $Fb_0$) in the normal operation, in accordance with the discrimination result. Accordingly, an oil-balancing operation can be executed at least once for each time T to thereby provide the oil-balancing effect.

Even if both of the operational frequencies Fa and Fb of compressors 1 and 2 reach the maximum values, it is possible to surely execute the oil-balancing operation at the time the operational frequency is reduced by n step frequencies than $Fa_0$ (or $Fb_0$) in the normal operation. Accordingly, an oil-balancing operation can be executed at least once for each time T to thereby provide the oil-balancing effect.

Even if both of the operational frequencies Fa and Fb of compressors 1 and 2 reach the minimum values, it is possible to surely execute the oil-balancing operation at the time the operational frequency is increased by n step frequencies than $Fa_0$ (or $Fb_0$) in the normal operation. Accordingly, an oil-balancing operation can be executed at least once for each time T to thereby provide the oil-balancing effect.

This invention is in no way restricted to the above embodiment. For instance, although the above description of the embodiment has been given with reference to the case where three indoor units are employed, this invention can similarly apply to a case with more than three or only two indoor units. This invention can of course be modified in various manners within the scope and spirit of the invention.

As described above, the air conditioner system according to the first embodiment of this invention is designed such that an oil-balancing pipe is provided between the individual compressors and that the following operations are repeated for a given cycle T during a parallel operation of both compressors.

(1) The normal operation for driving both compressors at substantially the same operational frequency over a given time $t_0$ during their parallel operation.

(2) The first oil-balancing operation which follows the normal operation and drives one of the compressors at alternate higher and lower operational frequencies than the operational frequency of the other compressor for every given times $t_1$ and $t_2$ while maintaining the operational frequency of the latter compressor at a predetermined level.

(3) The second oil-balancing operation which drives the compressors with the relation of their operational frequencies involved in the first oil-balancing operation being reversed after the normal operation is carried out following the first oil-balancing operation.

With this design, the present air conditioner system can provide an oil-balancing effect between the individual compressors without using a large-diameter oil-balancing pipe, thus preventing generation of compressor vibration and compressor noise as well as providing the oil-balancing pipe with a sufficiently high mechanical strength. This can contribute to improving the reliability of the system.

The second embodiment of this invention will now be described.

The air conditioner system according to the second embodiment of this invention operates as follows. During parallel operation of both compressors, a normal operation for controlling the net capability of both compressors is executed over a given time $t_0$; this control is done by combination of the first drive mode in which both compressors are driven at substantially the same operational frequency, and the second drive mode in which the compressors are driven with a predetermined difference given in operational frequencies of the compressors. After this normal operation, the first oil-balancing operation is performed which first drives both compressors at substantially the same operational frequency over a given time t and drives one of the compressors at alternate higher and lower operational frequencies for every given times $t_1$ and $t_2$ with respect to the other compressor while maintaining the operational frequency of the latter compressor at a predetermined level. The second oil-balancing operation which drives the compressors with the relation of their operational frequencies involved in the first oil-balancing operation being reversed after the normal operation following the first oil-balancing operation has been carried out.

The air conditioner system according to the second embodiment can improve the resolution of the net capability of both compressors by controlling the combination of the first drive mode for driving both compressors in parallel operation at substantially the same operational frequency in the normal operation and the second drive mode for driving the compressors with a given difference in their operational frequencies. In addition, during the oil-balancing operation, both compressors are first driven at substantially the same operational frequency and then one of them is driven at alternate higher and lower operational frequencies than that of the other compressor for each given time period while maintaining the operational frequency of the latter compressor at a constant level. This prevents the oil-balancing operation from being executed while both compressors are driven in the second drive mode. Further, the second oil-balancing operation is repeated for every given cycle before and after the first oil-balancing operation is executed. Under the first and second oil-balancing operations, the operational frequencies of these compressors are changed, one higher than the other, so that the lubricating oil in the casings of both compressors can efficiently flow through the oil-balancing pipe. Therefore, this air conditioner system can provide oil-balancing effect between the individual compressors without employing a large-diameter oil-balancing pipe and can prevent generation of compressor vibration and compressor noise.

The second embodiment has the same structure as the first embodiment shown in FIGS. 1 through 3, and its operation is the same as that of the first embodiment except for operation (frequency) control and oil-balancing (operation) control for compressors 1 and 2 which are executed by outdoor controller 50 (to be described later).

According to the second embodiment, outdoor controller 50 controls the net capability of two compressors 1 and 2 in parallel operation by combining the first drive mode for driving both compressors 1 and 2 at substantially the same operational frequency in the normal operation and the second drive mode for driving the compressors with a given difference in their operational frequencies. Suppose that compressors 1 and 2 are driven with the operational frequency Fa of one compressor 1 being set to $Fa_0$ and the operational frequency Fb of the other one being set to $Fb_0$ ($Fa_0=Fb_0$) (first drive mode). In this mode, let us assume that the net of demand capabilities of individual indoor units C, D and E is sequentially increased. First, the operational frequency Fa of compressor 1 is increased to $Fa_0+\Delta F$ and the operational frequency Fb of compressor 2 is maintained at $Fb_0$ to provide a given frequency difference therebetween, and both compressors are driven under this condition (second drive mode). Then, after both compressors are driven for a given time under the above condition, the operational frequency Fb of compressor 2 is increased to $Fb_0+\Delta F$, the operational frequency Fa of compressor 1 is maintained at $Fa_0+\Delta F$, and both compressors are driven at the same operational frequency for a given time under this condition (first drive mode). Further, similarly, the operational frequency Fa of compressor 1 is increased to $Fa_0+2\Delta F$, the operational frequency Fb of compressor 2 is maintained at $Fb_0+\Delta F$ to provide a given frequency difference therebetween, and both compressors are driven for a given time under this condition (second drive mode). Subsequently, the operational frequency Fb of compressor 2 is increased to $Fb_0+2\Delta F$, the operational frequency Fa of compressor 1 is maintained at $Fa_0+2\Delta F$, and both compressors are driven at the same operational frequency for a given time (first drive mode). The net capability of both compressors 1 and 2 is controlled to come to the state which corresponds to the sum of the demand capabilities of indoor units C, D and E by alternately repeating the first and second drive modes. Accordingly, the resolution of the net capability of compressors 1 and 2 can be improved as compared with the case where the operational frequencies Fa and Fb of both compressors 1 and 2 are changed at the same time as the net capability of compressors 1 and 2 is changed. It is therefore possible to finely control the net capability of compressors 1 and 2 in accordance with a change in the sum of the demand capabilities of indoor units C, D and E, thereby improving the operational efficiency of both compressors 1 and 2 and the pleasantness.

Outdoor controller 50 performs oil-balancing (operation) control to balance the amounts of the lubricating oil in the casings of compressors 1 and 2 during their parallel operation.

Figure 7:
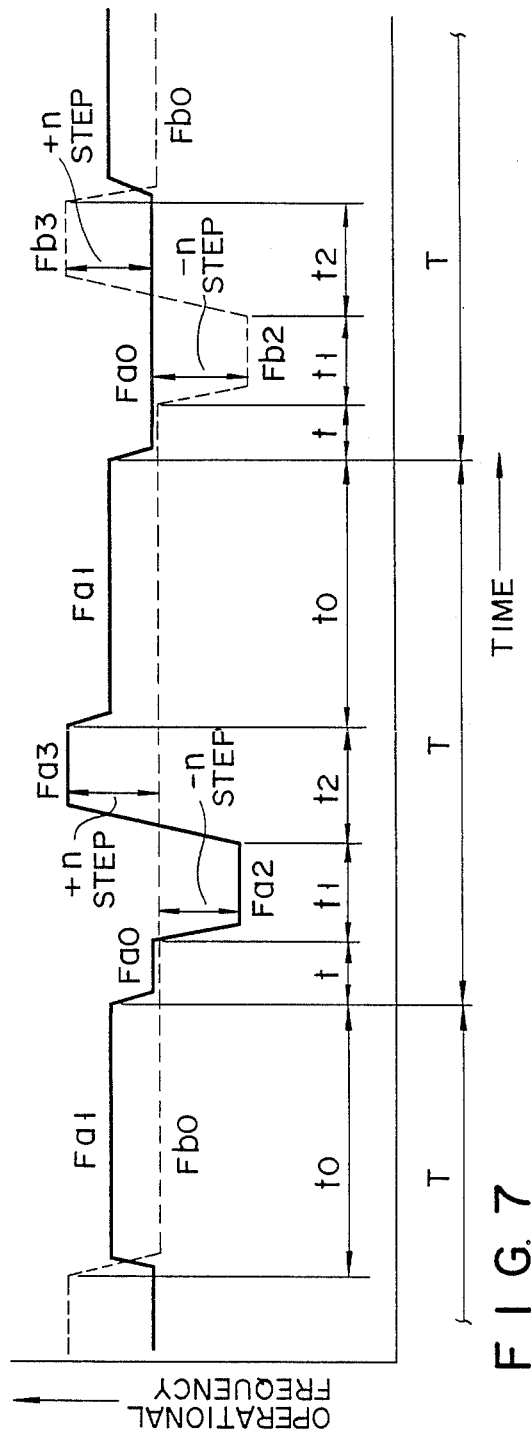
FIG. 7 is a characteristic diagram illustrating a change in the operational frequency at the time of oil-balancing operation according to the second embodiment.

Referring now to FIG. 7, a description will be given of the oil-balancing operation of compressors 1 and 2. FIG. 7 illustrates a change in operational frequency Fa of one of the compressor, 1, (which is illustrated by the solid line in FIG. 7) and a change in operational frequency Fb of the other compressor 2 (which is illustrated by the broken line) in the oil-balancing operation.

Suppose that compressors 1 and 2 are driven in the normal operation mode (in which the first and second drive modes are alternately repeated), and are operating in the second drive mode. For descriptive simplification, however, FIG. 7 shows the normal operation being carried out only in the second drive mode. Let us assume that the operational frequency Fa of compressor 1 is set at $Fa_1$ and operational frequency Fb of compressor 2 is set at $Fb_0$ $Fb_0 = Fb_0$; $Fa_1 = Fa_0 + \Delta F > Fb_0$), as shown in FIG. 7. Then, the first oil-balancing operation is executed after a given time $t_0$ elapses under this condition.

In the first oil-balancing operation, the operational frequency Fa of compressor 1 is decreased to $Fa_0$ from $Fa_1$ first, and both compressors 1 and 2 are driven at substantially the same operational frequency (operational frequency Fa being $Fa_0$ and operational frequency Fb being $Fb_0$) for a given time t (t=10 sec., for example). Then, the operational frequency Fa of one compressor 1 is reduced by n step frequencies over time $t_1$. In this case, the operational frequency Fb of the other compressor 2 is maintained at $Fb_0$. Accordingly, the operational frequency $Fa_2$ of compressor 1 becomes lower than the operational frequency $Fb_0$ of compressor 2. As a result, the internal casing pressure Pa of compressor 1 gets higher than the internal casing pressure Pb of compressor 2, so that the lubricating oil in the casing of high-pressure-side compressor 1 gradually flows together with the cooling medium in the casing of low-pressure-side compressor 2 through pipe 45. This gradually lowers the oil level within the casing of compressor 1 and gradually increases the oil level within the casing of compressor 2, as shown in FIG. 5. The lower limit of the oil level in the casing of compressor 1 is the bottom line of pipe 45 in this case.

When time $t_1$ elapses with the operational frequency Fa of compressor 1 being reduced to $Fa_2$, this frequency Fa is increased by n step frequencies from $Fa_0$ over time $t_2$. In this case, the operational frequency Fb of the other compressor 2 is maintained at $Fb_0$. Accordingly, the operational frequency $Fa_3$ of compressor 1 becomes higher than the operational frequency $Fb_0$ of compressor 2. As a result, the internal casing pressure Pa of compressor 1 gets lower than the internal casing pressure Pb of compressor 2, so that the lubricating oil in the casing of high-pressure-side compressor 2 gradually flows together with the cooling medium in the casing of low-pressure-side compressor 1 through pipe 45. This gradually lowers the oil level within the casing of compressor 2 and gradually increases the oil level within the casing of compressor 1, as shown in FIG. 6.

When time $t_2$ elapses with the operational frequency Fa of compressor 1 being increased to $Fa_3$, the first oil-balancing operation is completed at this moment, and the operation is returned to the normal operation with this frequency Fa being set back to $Fa_1$. In the normal operation region after completing the first oil-balancing operation, therefore, the oil level in the casing of compressor 1 is kept higher than that in the casing of compressor 2, as shown in FIG. 6. When a given time t0 elapses in this normal operation mode, the operation is performed with the relation of the operational frequencies of both compressors 1 and 2 being reversed (second oil-balancing operation).

At the time of the second oil-balancing operation, first, the operational frequency Fa of compressor 1 is decreased to $Fa_0$ from $Fa_1$ first, and both compressors 1 and 2 are driven at substantially the same operational frequency (operational frequency Fa being $Fa_0$ and operational frequency Fb being $Fb_0$) for a given time t. Then, the operational frequency Fb of compressor 2 is reduced by n step frequencies over time $t_1$. In this case, the operational frequency Fa of compressor 1 is maintained at $Fa_0$. Accordingly, the operational frequency $Fb_2$ of compressor 2 becomes lower than the operational frequency $Fa_0$ of compressor 1. As a result, the internal casing pressure Pb of compressor 2 gets higher than the internal casing pressure Pa of compressor 1, so that the lubricating oil in the casing of high-pressure-side compressor 2 gradually flows together with the cooling medium in the casing of low-pressure-side compressor 1 through pipe 45. This gradually lowers the oil level within the casing of compressor 2 and gradually increases the oil level within the casing of compressor 1, as shown in FIG. 6.

When time $t_1$ elapses with the operational frequency Fb of compressor 2 being reduced to $Fb_2$, this frequency Fb is increased by n step frequencies from $Fb_0$ over time $t_2$. In this case, the operational frequency Fa of compressor 1 is maintained at $Fa_0$. Accordingly, the operational frequency $Fb_3$ of compressor 2 becomes higher than the operational frequency $Fa_0$ of compressor 1. As a result, the internal casing pressure Pb of compressor 2 gets lower than the internal casing pressure Pa of compressor 1, so that the lubricating oil in the casing of high-pressure-side compressor 1 gradually flows together with the cooling medium in the casing of low-pressure-side compressor 2 through pipe 45. This gradually lowers the oil level within the casing of compressor 1 and gradually increases the oil level within the casing of compressor 2, as shown in FIG. 5.

When time $t_2$ elapses with the operational frequency Fb of compressor 2 being increased to $Fb_3$, the operation is returned to the normal operation at this moment, with this frequency Fb being set back to $Fb_0$ while setting back the operational frequency Fa of 1 compressor 1 to $Fa_1$. In the normal operation region after completing the second oil-balancing operation, therefore, the oil level in the casing of compressor 2 is kept higher than that in the casing of compressor 1, as shown in FIG. 5. Thereafter, the normal operation and the first oil-balancing operation or the second oil-balancing operation are alternately repeated for a given time period T.

The air conditioner system with the above structure therefore performs such a control as to repeat the following operations for a given cycle during a parallel operation of both compressors 1 and 2:

(1) The first oil-balancing operation which follows the normal operation and drives one of compressors, for example, 1, at alternate higher and lower operational frequencies Fa than the operational frequency Fb of the other compressor 2 for every given times $t_1$ and $t_2$ while maintaining the operational frequency Fb of the latter compressor 2 at a predetermined frequency $Fb_0$.

(2) The second oil-balancing operation which drives compressors 1 and 2 with the relation of their operational frequencies involved in the first oil-balancing operation being reversed after the normal operation is carried out following the first oil-balancing operation.

Accordingly, it is possible to alternately switch the oil level statuses in compressors 1 and 2 in the normal operation range after completion of the first oil-balancing operation and those in the normal operation range after completion of the second oil-balancing operation from one to the other.

According to the second embodiment, therefore, the following advantages can be obtained in addition to various advantages attained by the first embodiment.

The air conditioner system according to the second embodiment can improve the resolution of the net capability of both compressors 1 and 2 by controlling the combination of the first drive mode for driving both compressors 1 and 2 in parallel operation at substantially the same operational frequency ($Fa_0 \approx Fb_0$) in the normal operation and the second drive mode for driving the compressors with a given difference $\Delta F$ in their operational frequencies.

Further, according to the second embodiment, during the oil-balancing operation, both compressors 1 and 2 are first driven at substantially the same operational frequency ($Fa_0 \approx Fb_0$) and then one of them is driven at alternate higher and lower operational frequencies than that of the other compressor. This prevents the oil-balancing operation from being executed while both compressors are driven in the second drive mode. It is therefore possible to surely prevent the difference $\Delta F$ of the operational frequencies of compressors 1 and 2 in the oil-balancing operation from being imbalanced when the oil-balancing operation has started with both compressors 1 and 2 being driven in the second drive mode. In other words, an oil-balancing effect can be attained even when the operation advances to the oil-balancing operation with compressors 1 and 2 both being in the second drive mode.

The air conditioner system according to the second embodiment of this invention operates as follows. During parallel operation of both compressors, a normal operation for controlling the net capability of both compressors is executed over a given time $t_0$; this control is done by combination of the first drive mode in which both compressors are driven at substantially the same operational frequency, and the second drive mode in which the compressors are driven with a predetermined difference given in operational frequencies of the compressors. After this normal operation, the first oil-balancing operation is performed which first drives both compressors at substantially the same operational frequency over a given time $t$ and drives one of the compressors at alternate higher and lower operational frequencies for every given times $t_1$ and $t_2$ with respect to the other compressor while maintaining the operational frequency of the latter compressor at a predetermined level. The second oil-balancing operation which drives the compressors with the relation of their operational frequencies involved in the first oil-balancing operation being reversed after the normal operation following the first oil-balancing operation has been carried out.

The air conditioner system according to the second embodiment can provide an oil-balancing effect between the individual compressors without using a large-diameter oil-balancing pipe, thus preventing generation of compressor vibration and compressor noise as well as providing the oil-balancing pipe with a sufficiently high mechanical strength. This can contribute to improving the reliability of the system.

The third embodiment of this invention will now be described.

The first and second embodiments basically cyclically perform the oil-balancing operation to provide a given difference between the output frequencies of the individual inverter circuits during parallel operation of the individual compressors to overcome an unbalance in the refrigerating oil (lubricating oil) in the individual compressors, thereby protecting the compressors.

Although there is not a significant difference between the output frequencies of the individual inverter circuits during parallel operation of two compressors, the current release can independently function for each inverter circuit. When a current release functions for either one of the inverter circuits, therefore, there would cause a significant difference between the output frequencies of the inverter circuits. Further, this difference may result from various conditions such as a difference in capability or capacity (horse power) of the individual compressors or the current release functioning simultaneously for the individual inverter circuits.

Since the current release has a priority over the oil-balancing operation, it may interrupt the oil-balancing operation, thus making the proper transition to frequency control after the current release difficult. This would result in an improper oil-balancing effect.

To ensure an oil-balancing operation free of the influence of the current release, therefore, the air conditioner system according to the third embodiment comprises:

two inverter circuits for supplying drive power to individual compressors;

means for controlling the output frequencies of these inverter circuits in accordance with the sum of the demand capabilities of the individual indoor units;

means for cyclically performing an oil-balancing operation to provide a given difference between the output frequencies of the inverter circuits during parallel operation of the compressors;

current detecting means for detecting an incoming current to the inverter circuits;

current release means for reducing the output frequency of that inverter circuit whose incoming current is detected to exceed a set value, to a given value; and means for setting the output frequency of the other inverter circuit to the given value at the time a current release is effected.

With the above arrangement, when the input current to an inverter circuit exceeds a set value, a current release is executed so that the output frequency of that inverter circuit is reduced by a given value. At this time, the output frequency of the other inverter circuit is set at the same value to eliminate a possible difference between the output frequencies of the individual inverter circuits.

The third embodiment basically has the same structure and function as the first embodiment shown in FIGS. 1 through 3, but differs therefrom only in the current release function added to outdoor controller 50 (to be described later).

FIG. 8 illustrates a specific example of outdoor controller 50 and its peripheral units as used in the third embodiment.

Outdoor controller 50 comprises a microcomputer 100 serving as a main unit, inverter microcomputers 101 and 102 for driving and controlling inverters and inverter drivers 103 and 104.

Inverter circuits 51 and 52 respectively have current detectors 111 and 112 that serve to detect input currents. The detection outputs of these current detectors 111 and 112 are supplied to inverter microcomputers 101 and 102.

Microcomputer 100 sends a command corresponding to the frequency setting signal $f_0$ from branching unit B, to inverter microcomputers 101 and 102 and detects the output frequencies of inverter circuits 51 and 52 by means of return signals from these inverter microcomputers 101 and 102.

Inverter microcomputers 101 and 102 controls inverter drivers 103 and 104 in accordance with a command from microcomputer 100 and discriminates the output frequencies of inverter circuits 51 and 52 from the detection currents from current detectors 111 and 112. Inverter microcomputers 101 and 102 then return the discrimination results to microcomputer 100. When the detection currents from current detectors 111 and 112 exceed a set value, microcomputer 100 discriminates the event as an abnormal input current. Microcomputer 100 then performs a current release control to reduce the output frequency of the associated inverter circuit to a given value and other control such that the output frequency of the other inverter circuit is set equal to that of the former inverter circuit.

Inverter drivers 103 and 104 render the switching elements of inverter circuits 51 and 52 ON and OFF to provide AC voltages with a predetermined frequency from these inverter circuits 51 and 52.

The operation of thus constructed air conditioner system will be described below.

Assume now that all the indoor units are performing a cooling operation.

At this time, as described earlier, indoor controller 70 of indoor unit C calculates the difference between the temperature detected by indoor temperature sensor 72 and the temperature set through operation section 71 and sends the frequency setting signal $f_1$ corresponding to the temperature difference to multicontroller 60 as the requested cooling capability (see FIGS. 1 and 3).

Similarly, indoor controllers 80 and 90 of indoor units D and E send the frequency setting signals $f_2$ and $f_3$ as the requested cooling capabilities to multicontroller 60.

Based on the received frequency setting signals, multi-controller 60 attains the sum of the requested cooling capabilities of the individual indoor units and sends the frequency setting signal $f_0$ corresponding to the acquired sum to outdoor controller 50.

Based on the received frequency setting signal $f_0$, outdoor controller 50 controls the quantity of compressors 1 and 2 in operation and the operational frequency (output frequencies of inverter circuits 51 and 52).

In this case, as the sum of the requested cooling capabilities increases, outdoor controller 50 changes a single-compressor operation involving compressor 1 to a parallel operation involving both compressors 1 and 2.

Multi-controller 60 controls the openings of flow rate control valves 11, 21 and 31 in accordance with the requested cooling capabilities from indoor units C, D and E, so that the proper amounts of the cooling medium flowing to indoor heat exchangers 14, 24 and 34, respectively to maintain the heat application to the cooling medium at a constant level.

During parallel operation of two compressors 1 and 2, outdoor controller 50 cyclically performs the oil-balancing operation.

In this oil-balancing operation, for example, the output frequency of inverter circuit 51 is set to a command frequency (based on the sum of the requested cooling capabilities) and the output frequency of inverter circuit 52 is vertically changed within a given range around the set value so as to provide a given difference between the output frequencies of inverter circuits 51 and 52.

In this case, when the output frequency of inverter circuit 51 gets higher than that of inverter circuit 52, the casing pressure of compressor 1 becomes lower than the casing pressure of compressor 2, thus making it easier for the refrigerating oil in compressor 2 to flow to compressor 1 through pipe 45. On the other hand, when the output frequency of inverter circuit 52 gets higher than that of inverter circuit 51, the casing pressure of compressor 2 becomes lower than the casing pressure of compressor 1, thus making it easier for the refrigerating oil in compressor 1 to flow to compressor 2 through pipe 45.

After this oil-balancing operation is executed over a given time based on the count of an internal timer of microcomputer 100, the output frequencies of 51 and 52 are set to the command frequency and the normal operation will be returned.

Inverter microcomputers 101 and 102 of outdoor controller 50 shown in FIG. 8 monitor the detection currents from current detectors 111 and 112; when the detection current reaches the P region exceeding the set value I2 shown in FIG. 9, microcomputers 101 and 102 discriminate the event as an abnormal input current.

When the abnormal input current to inverter circuit 51 is detected, the output frequency of inverter circuit 51 is reduced by a given amount to perform the current release. This reduction in frequency is executed by priority irrespective of the aforementioned oil-balancing operation being in progress, and it is done for each reception of the detection current until this current falls off the P region. When the detection current falls to the Q region between $I_1$ and $I_2$, the output frequency of inverter circuit 51 is retained as it is. When the detection current further falls down to the 0 region below $I_1$, the current release is stopped and the output frequency is set at the command frequency.

At this time, microcomputer 100 compares the content (command frequency) of a command to inverter microcomputer 101 with the content of a return signal from this inverter microcomputer 101 (i.e., the output frequency of inverter circuit 51). When these contents differ from each other, microcomputer 100 detects that the current release has been effected in inverter circuit 51, and immediately sets the output frequency of inverter circuit 52 through inverter microcomputer 101 to the same value as the output frequency of inverter circuit 51.

Similarly, with regard to an abnormal input current to inverter circuit 52, a current release for reducing the output frequency of this inverter circuit 52 executed. At the same time, the output frequency of inverter circuit 51 is set to be equal to the output frequency of inverter circuit 52.

Further, when abnormal input currents are simultaneously supplied to inverter circuits 51 and 52, the current release is executed for both the inverter circuits 51 and 52. In this case, microcomputer 101 compares the reduced output frequencies of inverter circuits 51 and 52 and sets the higher output frequency to equal to the lower one.

In this manner, the current release is executed in at least one of inverter circuits 51 and 52. The output frequency of the other inverter circuit is set to that of the inverter circuit undergoing the current release. Accordingly, even when the current release interrupts the oil-balancing operation, transition to the frequency control after the current release can be easily and smoothly carried out by eliminating a difference between the output frequencies of the individual inverter circuits. It is therefore possible to surely execute the oil-balancing operation without adverse influence from the current release, thus preventing a so-called dry out of oil in compressors 1 and 2 and ensuring a constant, stable operation with a high efficiency.

Since compressors 1 and 2 are provided with an oil bypass passage such as an oil separator, the refrigerating oil can be efficiently collected.

The above description of the third embodiment have been given with reference only to a cooling operation, but this invention can also apply to a heating operation to produce the same effects.

Although the above description discusses the case involving three indoor units, this invention can deal with more than three or only two indoor units easily.

It should be noted that this invention is in no way restricted to the above particular embodiment, but can be modified in various manners without departing from its scope.

As described above, the air conditioner system according to the third embodiment comprises two inverter circuits for supplying drive power to individual compressors; means for controlling the output frequencies of these inverter circuits in accordance with the sum of the demand capabilities of the individual indoor units; means for cyclically performing an oil-balancing operation to provide a given difference between the output frequencies of the inverter circuits during parallel operation of the compressors; current detecting means for detecting an incoming current to the inverter circuits; current release means for reducing the output frequency of that inverter circuit whose incoming current is detected to exceed a set value, to a given value; and means for setting the output frequency of the other inverter circuit to the given value at the time a current release is effected. This air conditioner system according to this embodiment can therefore surely carry out the oil-balancing operation without adverse influence of execution of a current release, thereby ensuring a constant, stable operation.

What is claimed is:

1. An air conditioner comprising:
    an outdoor unit having at least two variable-capability compressors and an outdoor heat exchanger coupled to said compressors having lubricating oil supplying sections coupled together by an oil-balancing member;
    a plurality of indoor units each coupled to said outdoor unit for forming a refrigerating cycle and each having at least an indoor heat exchanger and means for outputting demand capability data according to an air conditioning load of said indoor heat exchanger; and
    control means for generating, in accordance with said demand capability data, a parallel operation command for parallel operation involving both of said compressors of said outdoor unit with capability according to a sum of said demand capability data from said indoor units, said parallel operation command being a repetition of a normal operation command for performing a normal operation over a given time and first and second oil-balancing operation commands for every given cycle, said first and second oil-balancing operation commands for effecting first and second oil-balancing operations having a mutually complimentary relation in preceding and succeeding stages of said normal operation.

2. The air conditioner according to claim 1, wherein said normal operation command permits an operation with substantially a same, given capability by both of said two variable-capability compressors.

3. The air conditioner according to claim 1, wherein said first oil-balancing operation command permits one of said two variable-capability compressors to be driven at alternate higher and lower capabilities than that of the other compressor for a given time.

4. The air conditioner according to claim 3, wherein said second oil-balancing operation command permits said two variable-capability compressors to be driven in a capability relation opposite to that involved in said first oil-balancing operation command.

5. The air conditioner according to claim 1, wherein said normal operation command permits an alternate execute of a first operation in which said two variable-capability compressors have substantially a same given, capability and a second operation in which a given capability difference is provided between said compressors.

6. The air conditioner according to claim 5, wherein said first oil-balancing operation command permits an operation without said given capability difference for a given time when said second operation by said normal operation command is executed, and then permits said two variable-capability compressors to be driven with said capability of one of said compressor being set higher and lower than that of the other compressor over a given time.

7. The air conditioner according to claim 6, wherein said second oil-balancing operation command permits an operation without said given capability difference for a given time when said second operation by said normal operation command is executed, and then permits said two variable-capability compressors to be driven with a capability relation being set opposite to that brought by said first oil-balancing operation command.

8. The air conditioner according to claim 1, wherein said means for outputting said demand capability in each of said plurality of indoor units includes detecting means for detecting an air conditioning load of said indoor heat exchanger.

9. The air conditioner according to claim 1, further comprising a branch unit for providing parallel connection between said outdoor unit and said plurality of indoor units to form respective refrigerating cycles, and having a plurality of cooling medium flow rate controlling means for refrigerating cycles.

10. The air conditioner according to claim 9, further comprising second control means for supplying a control command to each of said cooling medium flow rate controlling means of said branch unit in accordance with demand capability data from said plurality of indoor units, and outputting sum data of each of said demand capability data.

11. The air conditioner according to claim 1, wherein said two variable-capability compressors are coupled in parallel to each other through check valves provided on cooling medium outlet sides thereof.

12. The air conditioner according to claim 1, wherein said said outdoor unit further has a four-way valve, a parallel arrangement of a heating expansion valve, a check valve for forming a cooling cycle, a liquid tank and an accumulator.

13. The air conditioner according to claim 9, wherein said branch unit further has parallel arrangements each having a plurality of cooling heat expansion valves, and a plurality of gas side opening valves.

14. The air conditioner according to claim 11, wherein said outdoor unit further has oil separators provided between cooling medium outlet sides of said two variable-capability compressors and said check valves, and oil bypass means provided to extend from said oil separators to cooling medium inlet sides of said compressors.

15. The air conditioner according to claim 1, wherein said oil-balancing member of said outdoor unit has an oil-balancing pipe for providing communication between bottom sections of said two variable-capability compressors.

16. The air conditioner according to claim 8, wherein said detecting means has an operation section for setting an indoor temperature, a temperature sensor for detecting an indoor temperature, and an indoor controller for computing a difference between said temperature set through said operation section and said temperature detected by said temperature sensor and outputting said demand capability data corresponding to said temperature difference.

17. The air conditioner according to claim 10, wherein said second control means serves as a multicontroller in said branch unit.

18. The air conditioner according to claim 1, wherein said control means is provided as an indoor controller in said outdoor unit.

19. The air conditioner according to claim 18, wherein said outdoor controller comprises a microcomputer and peripheral circuits and is coupled to motors of said two variable-capability compressors through two inverters externally coupled to said outdoor controller.

20. The air conditioner according to claim 19, wherein said demand capability data and said sum data are output operational frequency setting signals for output operation.

21. An air conditioner comprising:
an outdoor unit having two inverters for supplying a drive output of a given operational frequency, two compressor motors driven with a variable speed in response to reception of said drive outputs of said two inverters, at least two variable-capability compressors coupled to said two compressor motors, and an outdoor heat exchanger coupled to said compressors having lubricating oil supplying sections coupled together by an oil-balancing member;
a plurality of indoor units each coupled to said outdoor unit for forming a refrigerating cycle and each having at least an indoor heat exchanger and means for outputting demand capability data according to an air conditioning load of said indoor heat exchanger; and
first control means for controlling output operation frequencies from said two inverters of said outdoor unit in accordance with said demand capability data from said plurality of indoor units;
second control means for cyclically performing an oil-balancing operation for providing a given difference between said output operational frequencies from said two inverters during parallel operation of said two variable-capability compressors of said outdoor unit;
third control means for independently detecting input currents to said two inverters of said outdoor unit and for, when a detection result is greater or equal to a given value, effecting a current release for reducing an output operational frequencies from a corresponding one of said inverters, by priority over said oil-balancing operation by said second control means; and
fourth control means for, when said current release to said one of said inverters is effected by said third control means, controlling said output operational frequency from the other inverter to be equal to a reduced output operational frequency of said one of said inverters.

22. The air conditioner according to claim 21, wherein said means for outputting said demand capability in each of said plurality of indoor units includes detecting means for detecting an air conditioning load of said indoor heat exchanger.

23. The air conditioner according to claim 21, further comprising a branch unit for providing parallel connection between said outdoor unit and said plurality of indoor units to form respective refrigerating cycles, and having a plurality of cooling medium flow rate controlling means for refrigerating cycles.

24. The air conditioner according to claim 23, further comprising fifth control means for supplying a control command to each of said cooling medium flow rate controlling means of said branch unit in accordance with demand capability data from said plurality of indoor units, and outputting sum data of each of said demand capability data.

25. The air conditioner according to claim 21, wherein said two variable-capability compressors are coupled in parallel to each other through check valves provided on cooling medium outlet sides thereof.

26. The air conditioner according to claim 21, wherein said said outdoor unit further has a four-way valve, a parallel arrangement of a heating expansion valve, a check valve for forming a cooling cycle, a liquid tank and an accumulator.

27. The air conditioner according to claim 23, wherein said branch unit further has parallel arrangements each having a plurality of cooling heat expansion valves, and a plurality of gas side opening valves.

28. The air conditioner according to claim 10, wherein said fifth control means serves as a multicontroller in said branch unit.

29. The air conditioner according to claim 21, wherein said first through fourth control means include a section serving as an outdoor controller in said outdoor unit.

30. A method for controlling an air conditioner comprising an outdoor unit having at least two variable-capability compressors and a plurality of indoor units, said method comprising the steps of:
controlling a quantity of said compressors in operation and operational frequencies thereof in accordance with demand capabilities of said indoor units;
carrying out a normal operation for driving both of said compressors at substantially a same operational frequency during parallel operation of said compressors; and
executing an oil-balancing operation by repeating, over a given cycle, a first oil-balancing operation in which said operational frequency of one of said compressors is set to be higher or lower than that of the other compressor for a given time while maintaining said operational frequency of said other compressor at a given operational frequency to thereby execute an oil-balancing operation through an oil-balancing pipe provided between said compressors, and a second oil-balancing operation in which an oil-balancing operation is executed by setting a relation of operation frequencies of said compressors opposite to that involved in said first oil-balancing operation.

31. A method for controlling an air conditioner comprising an outdoor unit having at least two variable-capability compressors and a plurality of indoor units, said method comprising the steps of:

controlling a quantity of said compressors in operation and operational frequencies thereof in accordance with demand capability of said indoor units;

controlling a net capability of said compressors by combining a first drive mode for driving both of said compressors at substantially a same operational frequency during parallel operation of said compressors and a second drive mode for driving said compressors with a given frequency difference being provided between said operational frequencies of said compressors;

executing a first oil-balancing operation in which both of said compressors are driven at substantially a same operation frequency and are then driven with the operational frequency of one of said compressors being set higher and lower for a given time than that of the other compressor; and executing a second oil-balancing operation in which said first oil-balancing operation is executed by setting a relation of operational frequencies of said compressors opposite to that involved in said first oil-balancing operation.

32. A method for controlling an air conditioner comprising an outdoor unit having at least two variable-capability compressors and two inverter circuits for supplying a drive power to said compressors, and a plurality of indoor units, said method comprising the steps of:

controlling output frequencies of said two inverter circuits in accordance with a sum of demand capabilities of said indoor units;

cyclically performing an oil-balancing operation to provide a given difference between said output frequencies of said inverter circuits during parallel operation of said compressors;

detecting an incoming current to said inverter circuits;

executing a current release for reducing said output frequency of that inverter circuit whose incoming current is detected in said current detecting step to have exceeded a set value, to a given value; and setting said output frequency of said other inverter circuit to said given value at a time a current release is effected.

* * * * *